United States Patent [19]
Kroth

[11] 4,076,324
[45] Feb. 28, 1978

[54] BRAKE SYSTEM

[75] Inventor: Neil W. Kroth, Joliet, Ill.

[73] Assignee: Caterpillar Tractor Co., Peoria, Ill.

[21] Appl. No.: 795,035

[22] Filed: May 9, 1977

[51] Int. Cl.² ................................................ B60T 13/14
[52] U.S. Cl. ...................................... 303/6 R; 303/10; 303/85
[58] Field of Search ............... 303/2, 6 C, 6 R, 9–11, 303/84 A, 84 R, 85

[56] References Cited

U.S. PATENT DOCUMENTS

| | | |
|---|---|---|
| 3,395,946 | 8/1968 | Medley et al. ............................ 303/2 |
| 3,423,136 | 1/1969 | Lohbauer ................................. 303/54 |
| 3,498,427 | 3/1970 | Bingley ................................. 192/13 R |
| 3,841,711 | 10/1974 | Stelzer ................................. 303/6 C |

Primary Examiner—Duane A. Reger
Attorney, Agent, or Firm—Phillips, Moore, Weissenberger, Lempio & Majestic

[57] ABSTRACT

In a vehicle including front and rear wheels having brakes associated therewith, a single master cylinder actuates a first brake valve operatively associated with the front wheels of the vehicle, and also a second brake valve operatively associated with the rear wheels of the vehicle.

9 Claims, 1 Drawing Figure

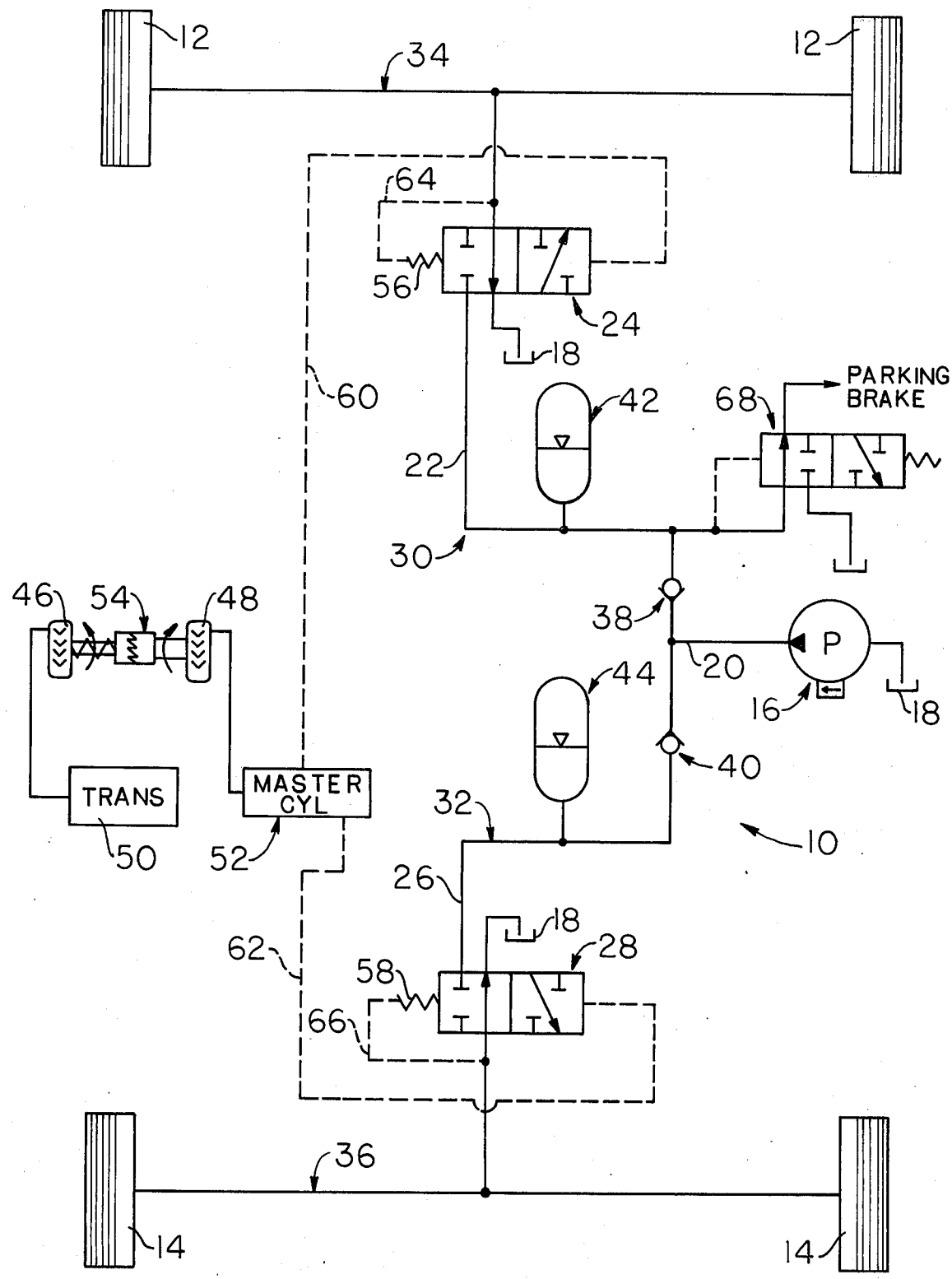

BRAKE SYSTEM

BACKGROUND OF THE INVENTION

This invention relates to brake systems, and more particularly, to a hydraulic brake system including a single master cylinder for actuating a pair of brake valves.

In a vehicle including front and rear wheels having respective front and rear brakes associated therewith, it is well understood that it is desirable to provide means whereby, for example, if a break occurs in either the front or rear fluid system, the brakes of the other system can still be applied. Yet it must also be understood that the overall system must be simple in design, utilizing a minimum of components, meanwhile using such components in a highly effective manner.

SUMMARY OF THE INVENTION

The present invention is directed to overcoming one or more of the problems as set forth above.

In accordance with the present invention, a fluid circuit for the braking system of a vehicle comprises fluid pump means, and first and second separate brake valves. First conduit means communicate the first brake valve with the fluid pump means, and second conduit means communicate a first brake of the vehicle with the first brake valve. The first brake valve is movable to a position providing communication from the pump means through the first conduit means, the first brake valve, the second conduit means to the first brake of the vehicle, whereby fluid pressure is applied from the pump means to the first brake, the first brake valve being movable to a position wherein fluid pressure is released therethrough from the first brake. Further included are third conduit means communicating the second brake valve with the fluid pump means, and fourth conduit means communicating a second brake of the vehicle with the second brake valve. The second brake valve is movable to a position providing communication from the pump means through the third conduit means, the second brake valve, the fourth conduit means, to the second brake, whereby fluid pressure from the pump means is applied to the second brake, the second brake valve being movable to a position wherein fluid pressure is released therethrough from the second brake. Further included is a master cylinder, and means operatively associated with the master cylinder and first and second brake valve comprising additional conduit means interconnecting the master cylinder and first and second brake valves, for providing selective movement of the first and second brake valves to their respective positions providing communication between the pump means and first and second brakes respectively, and for providing selective movement of the first and second brake valves to their respective positions providing release of fluid pressure from the first and second brakes.

BRIEF DESCRIPTION OF THE DRAWINGS

These and other objects of the invention will become apparent from a study of the following specification and drawing, which is a schematic representation of the fluid circuit which is the subject of the present invention.

DESCRIPTION OF THE PREFERRED EMBODIMENT

Shown in the drawing is the present fluid circuit 10 for the braking system of a vehicle. The vehicle includes front wheels 12, and rear wheels 14. A single pressure compensated variable fluid pump 16 draws hydraulic fluid from the reservoir 18. A main conduit 20 communicates with the outlet of the pump. A first branch conduit 22 provides communication between the main conduit 20 and a first brake valve 24, and a second branch conduit 26 provides communication between the main conduit 20 and a second brake valve 28. Each brake valve is of the type generally disclosed in U.S. Pat. No. 3,423,136 to Lohbauer, issued Jan. 21, 1969 (assigned to the assignee of this invention). The main conduit 20 and a branch conduit 22 make up conduit means 30 communicating the pump 16 with the brake valve 24, while the main conduit 20 and branch conduit 26 make up conduit means 32 communicating the pump 16 with the brake valve 28.

Conduit means 34 are also included, communicating the front brakes of the vehicle with the brake valve 24. Conduit means 36 are similarly included, communicating the rear brakes of the vehicle with the brake valve 28. The brakes are of the well-known type wherein they are applied upon application of fluid pressure thereto through the conduit means 34 and conduit means 36, and are released upon release of fluid pressure therefrom through the conduit means 34 and the conduit means 36.

Positioned in the branch conduit 22 is a check valve 38, which allows fluid flow from the pump 16 to the brake valve 24, but which blocks fluid flow from the brake valve 24 toward the pump 16, as will be further described. Also included is a check valve 40 in the branch conduit 32, which allows fluid flow from the pump 16 to the brake valve 28, but which blocks fluid flow from the brake valve 28 toward the pump 16. An accumulator 42 operatively communicates with the branch conduit 22, and an accumulator 44 operatively communicates with the branch conduit 26. The check valve 38 is positioned in the branch conduit 22 upstream of the accumulator 42, relative to fluid flow in the branch conduit 22 provided by the pump 16. Likewise, the check valve 40 is positioned in the branch conduit 26 upstream of the accumulator 44, relative to fluid flow in the branch conduit 26 provided by the pump 16.

A fluid actuating system is provided for moving the brake valves 24, 28 to appropriate operable positions, as will further be described. Such system includes first and second operator pedals 46, 48. The pedal 46 is operatively connected with the transmission 50 of the vehicle, and the pedal 48 is operatively connected with a single master cylinder 52 of the vehicle. The pedals 46, 48 are connected by ratchet apparatus 54 such that if the pedal 48 is depressed, ratcheting in such ratchet apparatus 54 takes place so that the pedal 46 is not actuated. The movement of such single pedal 48 provides actuation of the master cylinder 52.

However, if the pedal 46 is depressed, the other pedal 48 moves therewith, so that the master cylinder 52 is actuated to build up fluid pressure in the conduits 20, 22, 26, and also the pedal 46 is moved to vent the transmission 50.

The brake valve 24 is biased rightward by a spring 56 so as to be biased into a position wherein any pressure tending to actuate the front brakes is vented therethrough to tank 18. Also, it will be seen that the branch conduit 22 is blocked from communication with the conduit means 34. Similarly, a spring 58 biases the brake valve 28 rightward into a position wherein pressure from the pump 16 is blocked from conduit means 36 being vented to tank 18 through the brake valve 28.

The conduits 60, 62 interconnect the master cylinder 52 and brake valves 24, 28 respectively, so that actuation of the master cylinder 52 by the pedal 48 builds up fluid pressure in the conduits 60, 62, moving the brake valves 24, 28 leftwardly against the biasing springs 56, 58. As, for example, the brake valve 24 moves leftwardly, communication is provided from the pump 16 through the main conduit 20 through the branch conduit 22 past the check valve 38, through the brake valve 24, through the conduit means 34, and to the front brakes of the vehicle, so that fluid pressure is applied from the pump 16 to the front brakes. Similarly, upon actuation of the master cylinder 52, pressure is applied therefrom through conduit 62 to move the brake valve 28 leftwardly whereby fluid pressure is applied through the main conduit 20, through the branch conduit 26 past the check valve 40, through the brake valve 28, through the conduit means 36, to the rear brakes of the vehicle, whereupon the rear brakes of the vehicle are applied. Additional conduits 64, 66 communicate the conduit means 34 and conduit means 36 with the brake valves 24, 28 respectively, to limit the maximum amount of pressure which can be applied through the conduits 60, 62 against the springs 56, 58.

Upon lifting of the pedal 48, fluid pressure is released through the master cylinder 52 from the conduits 60, 62 allowing the springs 56, 58 to move the brake valves 24, 28 rightwardly. The brake valves 24, 28 are thereby moved to positions wherein fluid pressure is released from the front and rear brakes of the vehicle, through the paths described above.

A parking brake valve assembly 68 is included as shown.

It will be seen that with either brake valve in either position under normal circumstances, the accumulators 42, 44 have pressure applied thereto, so that pressure is built up therein. In fact, such accumulator pressures act in addition to the pressure supplied by the pump 16 to actuate the front and rear brakes under normal conditions.

It should also be understood that the operation of the brake valves 24, 28 could be staged in such a manner as to vary the extent of application of the front and rear brakes in relation to each other as desirable.

If, for example, conduit means 36 is broken, the valves 24, 28 will of course be movable upon actuation of the master cylinder 52, but of course no fluid pressure build up will take place in the conduit means 36 and rear brakes of the vehicle. In fact, upon actuation of the pedal 48, fluid pressure from the pump 16 will pass through main conduit 20, past the check valve 40, through branch conduit 26, through valve 28, and out the break in the conduit means 36. However, check valve 38, being positioned as described above and shown, will provide that pressure from the accumulator 42 is supplied to branch conduit 22, and through brake valve 24 (upon appropriate positioning thereof through actuation of the pedal 48), to conduit means 34 to the front brakes of the vehicle to actuate the front brakes. The accumulator 42 holds enough pressure to provide a number of stops of the vehicle, even though there is a break in, for example, the conduit means 36 of the vehicle.

The embodiments of the invention in which an exclusive property or privilege is claimed are defined as follows:

1. A fluid circuit for the braking system of a vehicle comprising:
   fluid pump means;
   first and second separate brake valves;
   first conduit means communicating the first brake valve with the fluid pump means;
   second conduit means communicating a first brake of the vehicle with the first brake valve;
   the first brake valve being movable to a position providing communication from the pump means through the first conduit means, the first brake valve, the second conduit means, to the first brake of the vehicle, whereby fluid pressure is applied from the pump means, to the first brake, the first brake valve being movable to a position wherein fluid pressure is released therethrough from the first brake;
   third conduit means communicating the second brake valve with the fluid pump means;
   fourth conduit means communicating a second brake of the vehicle with the second brake valve;
   the second brake valve being movable to a position providing communication from the pump means through the third conduit means, the second brake valve, the fourth conduit means, to the second brake, whereby fluid pressure from the pump means is applied to the second brake, the second brake valve being movable to a position wherein fluid pressure is released therethrough from the second brake;
   a master cylinder; and
   means operatively associated with the master cylinder and first and second brake valves comprising additional conduit means interconnecting the master cylinder and first and second brake valves, by providing selective movement of the first and second brake valves to their respective positions providing communication between the pump means and first and second brakes respectively, and for providing selective movement of the first and second brake valves to their respective positions providing release of fluid pressure from the first and second brakes by operation of the master cylinder.

2. The apparatus of claim 1 and further comprising first and second accumulator means operatively communicating with the first and third conduit means.

3. The apparatus of claim 1 and further comprising first and second check valves in the first and third conduit means respectively, the first check valve allowing fluid flow from the pump means to the first brake valve, but blocking fluid flow from the first brake valve toward the pump means, the second check valve allowing fluid flow from the pump means to the second brake valve, but blocking fluid flow from the second brake valve toward the pump means.

4. The apparatus of claim 3 and including a main conduit communicating with the pump means and first and second branch conduits, the first branch conduit providing communication between the main conduit and the first brake valve, the second branch conduit providing communication between the main conduit and the second brake valve, the first conduit means comprising the main conduit and the first branch conduit, the third conduit means comprising the main conduit and the second branch conduit, wherein the first check valve is positioned in the first branch conduit, and wherein the second check valve is positioned in the second branch conduit.

5. The apparatus of claim 4 and further comprising first accumulator means operatively communicating with the first branch conduit, and second accumulator means operatively communicating with the second branch conduit.

6. The apparatus of claim 5 wherein the first check valve is positioned in the first branch conduit upstream of the first accumulator, relative to fluid flow in the first branch conduit provided by the pump means, and wherein the second check valve is positioned in the second branch conduit upstream of the second accumulator, relative to fluid flow in the second branch conduit provided by the pump means.

7. The apparatus of claim 6 wherein the pump means comprise a single pump.

8. The apparatus of claim 1 wherein the pump means comprise a single pump.

9. The apparatus of claim 1 wherein the first and second brakes of the vehicle are applied upon application of fluid pressure thereto, and released upon release of fluid pressure therefrom.

* * * * *